(12) United States Patent
Arps et al.

(10) Patent No.: US 7,076,109 B2
(45) Date of Patent: Jul. 11, 2006

(54) SYSTEM AND METHOD OF AUTOMATICALLY DETERMINING THE DOMINANT PERIODICITY IN SEQUENTIAL BINARY DATA

(75) Inventors: Ronald Barthold Arps, San Jose, CA (US); Cormeliu Mihail Constantinescu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 10/112,786

(22) Filed: Mar. 28, 2002

(65) Prior Publication Data

US 2003/0185449 A1  Oct. 2, 2003

(51) Int. Cl.
*G06K 9/36* (2006.01)
*H04N 1/413* (2006.01)

(52) U.S. Cl. ........................ 382/248; 382/235; 382/246; 358/426.13

(58) Field of Classification Search ................ 382/232, 382/235, 239, 245, 246, 249, 248, 190, 199; 341/51, 107; 358/426.13
See application file for complete search history.

(56) References Cited

U.S. PATENT DOCUMENTS

| | | | | |
|---|---|---|---|---|
| 3,813,485 A | * | 5/1974 | Arps ........................... | 382/238 |
| 4,028,731 A | * | 6/1977 | Arps et al. ................. | 358/3.29 |
| 4,792,954 A | * | 12/1988 | Arps et al. .................. | 714/799 |
| 4,901,363 A | | 2/1990 | Toyokawa .................. | 382/239 |
| 5,023,611 A | | 6/1991 | Chamzas et al. ............. | 341/51 |
| 5,303,313 A | | 4/1994 | Mark et al. .................. | 382/235 |
| 5,455,846 A | * | 10/1995 | Gardner ....................... | 382/202 |
| 6,272,256 B1 | | 8/2001 | Arps et al. ................... | 382/249 |

OTHER PUBLICATIONS

"Multi-Dimentional Run-Length Coding and Decoding of Binary Images on Mite-Like Configurable, Network Image Processing System," IBM Technical Disclosure Bulletin, vol. 33, No. 6B, Nov. 1990, pp. 222-226.
"Image Process," IBM Technical Disclosure Bulletin, vol. 30, No. 12, May 1998, pp. 38-39.

(Continued)

*Primary Examiner*—Duy M. Dang
(74) *Attorney, Agent, or Firm*—Samuel A. Kassatly (57) ABSTRACT

A system and associated method automatically and very rapidly determine the dominant periodicity in sequential binary data. The method incorporates a fast binary autocorrelation function used to discover the dominant periodicity in a sequential binary signal, and exploits this information in a periodicity exploiting application, such as using any one or more of a pixel periodicity or an edge periodicity based compression method in order to compress periodic halftoned bitonal images. The method implements four processes: The first process describes setting up the data in a transition-based representation to facilitate an algorithm to quickly find an autocorrelation distribution derived from a sequential binary signal. The second process describes a fast dominant periodicity search algorithm. The third process describes an algorithm that estimates the dominant window for estimating the dominant periodicity within one line of two-dimensional sequential binary signal. The fourth process describes an algorithm that estimates the dominant periodicity within a large region in a two-dimensional sequential binary signal.

17 Claims, 7 Drawing Sheets

OTHER PUBLICATIONS

"Image Rotation," IBM Technical Disclosure Bulletin, vol. 30, No. 12, May 1998, pp. 42-43.

"Two-Dimensional Luminance Compression," IBM Technical Disclosure Bulletin, vol. 30, No. 4, Sep. 1987, pp. 1538-1541.

S. Forchhammer and K.S. Jensen, "Data Compression of Scanned Halftone Images," IEEE Trans. Com-42, p. 1881-1893.

J.P. Allebach, "Aliasing and Quantization in the Efficient Display of Images," J. Opt. Soc. Am., vol. 69, p. 869-977, Jun. 1979.

R. Conners and C. Harlow, "Toward a Structural Textural Analyzer Based on Statistical Methods," Computer Graphics and Image Processing, vol. 12, p. 224-256, 1980.

L.G.C. Hamey, "Computer Perception of Repetitive Features," Ph.D. thesis, Computer Science Dept., Carnegie Mellon Univ., 1988, Table of Contents.

F. Tomita et al., "Description of Textures by a Structural Analysis," IEEE Trans. On Pattern Analysis and Machine Intelligence, vol. 4 No. 2, p. 1 83-191, 1982.

F. Vilnrotter et al., "Structure Analysis of Natural Textures," IEEE Trans. On Pattern Analysis and Machine Intelligence, vol. 8, p. 76-89, 1986.

* cited by examiner

SYSTEM AND METHOD OF AUTOMATICALLY DETERMINING THE DOMINANT PERIODICITY IN SEQUENTIAL BINARY DATA

FIELD OF THE INVENTION

The present invention relates to the fast automatic finding of periodicities in sequential digital binary data. More particularly, this invention concerns a system and method of automatically and expeditiously determining the optimal or dominant periodicity in bitonal images, for use in data compression and/or other applications.

BACKGROUND OF THE INVENTION

Though the present invention can be used in a variety of different applications, the problems it addresses will be described in term of an exemplary application, namely bitonal image data compression. Data compression is a process of finding the most efficient way to represent a message in order to minimize the size of a message for transfer or storage. Data compression is usually comprised of two phases: choosing a model for the message source, and designing an efficient coding system for the model.

A message generated by an information source may assume several possible forms, depending upon the context in which the message was made, and the goal of compressed communication in general is to transmit the minimal encoded version of the original message such that the receiver of the message can still reconstruct it. Accordingly, the key to quick and effective compressed communication is minimizing the length of information that must be transferred to accurately send the correct message or in the case of a document or photograph, the correct image. Thus, the shortest representation of the source as a message itself is critical to efficient compressed communications.

Generally, if each piece of information sent representing a message or image is not equally likely to occur, it is more efficient on the average to allocate a short string to frequently occurring pieces of information and longer strings to less frequent pieces. Thus, Morse code allots the shortest string (a dot and pause) to the letter "e" because it appears most frequently in English words, and allots a long string (dash, dash, dot, dot and pause) to the less frequently appearing letter "z."

One important area in bitonal image data compression is the compression of periodic halftoned bitonal images used predominantly to prepare continuous tone photographic images for bitonal printing. Continuous tone (e.g., monochrome or color) photographs are transformed into one or more bitonal (e.g., black/white for monochrome) equivalent images, which in digital form are represented as a bitonal (e.g., "1" or "0" valued) "halftoned" images. Numerous methods used primarily for textual image compression have been attempted for compressing such bitonal halftoned images. For example, one-dimensional schemes, such as Modified Huffman (MH) coding, or two-dimensional schemes, such as the Modified Relative Element Address Designate (MR)—commonly referred to as the CCITT Group 3 compression scheme—are simple and efficient but unable to effectively compress halftoned images.

The MR coding method exploits vertical correlation between scan lines in textual images by attempting to code all black/white pixel color changes (BW edges) and white/black pixel color changes (WB edges) in an image with respect to a given reference edge located directly above in a previous line. If such coding fails or is not reproducible at a decoder, the method changes to an MH coding method, which uses alternating sequential run-length coders for alternating black and white runs. Note that this also equates to coding alternating BW and WB edge positions.

The MMR or Modified MR two-dimensional compressor coding method, widely known as the CCITT Group 4 compression scheme removes some error protection overhead from the MR coding method but is still unable to effectively compress halftoned images.

The problem with these one-and two-dimensional coding schemes for halftoned encoding is that binary halftoned representations of continuous tone images have very different distributions of run size and occurrences of reference edges from the text or line drawing images for which these schemes were designed. As a result, the amount of data required to represent halftoned images in "compressed" form when these schemes are used, may actually be greater than the amount of data required to represent the original uncompressed image.

More recently, complex coding methods like various Ziv-Lempel algorithms and the arithmetic coding based Joint Bi-level Image Experts Group (JBIG) algorithm as set forth in ITU-T Recommendation T.82, "Information Technology—Coded Representation of Picture and Audio Information—Progressive Bi-level Image Compression," have been developed which are aimed at compressing both textual and halftoned images. Unlike simple algorithms like MH, MR or MMR used for textual images, these complex algorithms can adjust to the more balanced white and black pixel probabilities and shorter run length characteristics of halftoned images. Moreover, the JBIG algorithms can also exploit a specified periodicity in a digital image to increase the compression they achieve, if such periodicity is identified and conveyed to the algorithm using a specified "lag interval" input parameter.

The problem is that the latter two periodicity exploiting algorithms do not include a fast and automatic method for finding the optimal or dominant period in each digital image, to be exploited to maximize the compression they can achieve.

More generally, rapidly finding the dominant periodicity is useful for optimizing many image-processing applications, such as scanning/descreening, segmentation, compression, etc. Most conventional methods for computing such a dominant hidden periodicity in a sequential binary "signal" are implemented in the "frequency domain," thus involving the computation of a complex transform function like the Fourier Transform in addition to other processing. In contrast to this, an exemplary reference that proposes a method for calculating the dominant periodicity in the "spatial domain", without using a complex transform into the frequency domain, is: U.S. Pat. No. 5,023,611 to Chamzas et al.

However, there is still an unsatisfied need in all of these applications, whether for compression or otherwise, for a much faster system and method that automatically determines the dominant periodicity; using algorithms that process in the spatial domain, including transition-based representations of the spatial domain, that are orders-of-magnitude faster than the above patent to Chamzas, et al.

SUMMARY OF THE INVENTION

The present invention satisfies this and other needs by providing a system and associated method for automatically and very rapidly determining the dominant periodicity in bitonal images. This is based in part on exploiting what are called "harmonic" peaks in the frequency domain, which show up as corresponding "sub-multiple" peaks in the spatial domain.

As used herein, bitonal image "periodicity" can be defined as: (1) pixel periodicity—that is, consistently having either identical or exactly opposite bitonal pixel color at some regular (periodic) distance (lag interval) apart; and (2) transition (or edge) periodicity—that is having transitions between the two pixel colors situated at some regular (periodic) distance (lag interval) apart. Two sub-cases are defined for the transition (or edge) periodicity: (2.a) same edge periodicity—where runs of alternating black and white pixel colors are separated, defining two types of alternating edge periodicities; and (2.b) mixed edge periodicity—where runs of alternating black and white colors are mixed, defining yet another type of edge periodicity.

More specifically, the method of the present invention incorporates a fast binary autocorrelation function used to discover the dominant periodicity in an image, and exploits this information using any one or more of a pixel periodicity or an edge periodicity based compression method in order to compress periodic halftoned bitonal images.

For dominant periodicity finding the present invention describes the use of fast methods based on autocorrelations in an equivalent "transition image," derived on-the-fly from the edges in the original image. For example, in 1-D (one dimensional) horizontal mixed edge periodicity finding, 1-D horizontal mixed edge autocorrelations are calculated from a transition-based image representation (like run-length, run-begin or run-end coding of the mixed edges along each horizontal raster scan line).

The foregoing and other features of the present invention are realized by the implementation of the following processes or algorithms:

The first process describes a fast algorithm whose objective is to quickly find a transition-based autocorrelation distribution derived from sequential binary data. This autocorrelation distribution is subsequently used to find the dominant periodicity for that sequential binary signal. As used herein, 'transition-based' representation covers the same or mixed edges.

The second process describes a fast search algorithm that uses the fast transition based autocorrelation distribution to determine (1) if a dominant periodicity for the sequential binary signal exists, and if so, (2) to identify such a dominant periodicity.

The third process describes an algorithm that estimates the dominant window for estimating the dominant periodicity within a single line in a two-dimensional sequential binary signal.

The fourth process describes an algorithm that estimates the dominant periodicity within a large sequence (or block) of lines in a two-dimensional sequential binary signal.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF PREFERRED EMBODIMENTS

Figure 1:
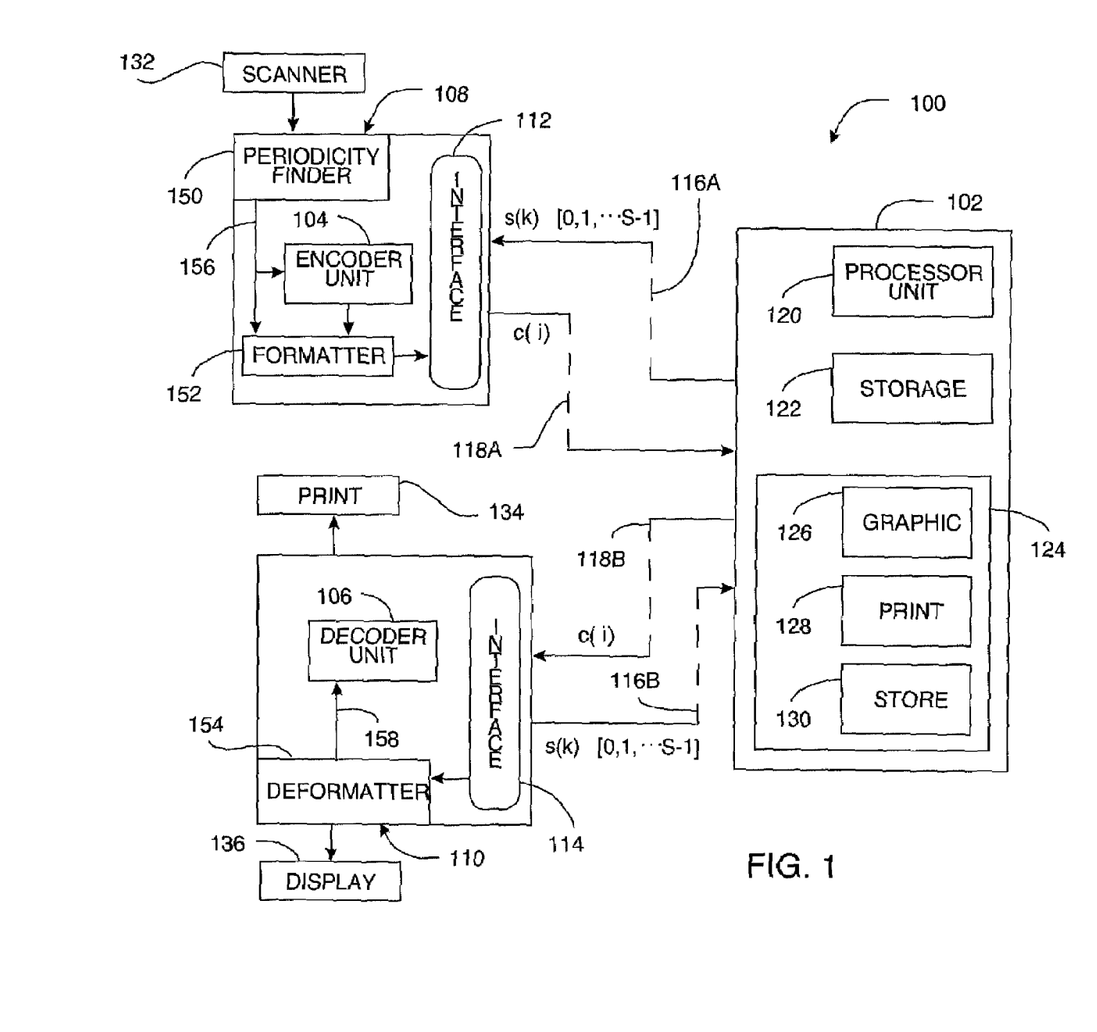
FIG. 1 is a block diagram of representative hardware components of an exemplary digital data processing apparatus that automatically determines the optimal or dominant periodicity in bitonal images and applies it in an application like periodicity exploiting bitonal image compression, according to the present invention.

One aspect of the invention concerns an apparatus which may be embodied by various hardware components and interconnections. FIG. 1 shows an example of one such digital data processing apparatus 100. The apparatus 100 may include a computer 102 housing a processor 120, such as a microprocessor or other processing machine, coupled to storage 122. In the present example, the storage 122 may include a fast-access memory and nonvolatile storage (not shown). The fast-access memory preferably comprises random access memory, and may be used to store the programming instructions executed by the processor 120 during such execution. The nonvolatile storage may comprise, for example, one or more magnetic data storage disks such as a "hard drive", a tape drive, or any other suitable storage device. The apparatus 100 also includes input channels 116A/116B and output channels 118A/118B, such as a line, bus, cable, electromagnetic link or other means, for exchanging data through an output formatter 152 with an encoder 104 and for exchanging data through an input deformatter 154 with a decoder 106. The encoder 104 is accompanied by a periodicity finder 150; whose periodicity output 156 is passed to the formatter 152 for inclusion as a periodicity parameter in the encoder output datastream, and passed to the encoder 104 for exploitation in encoding the periodicity exploiting compression data stream. The deformatter 154 extracts the periodicity parameter from the decoder input datastream and passes its periodicity output 158 to the decoder 106 for decoding the periodicity exploiting compression data stream.

In one embodiment, the computer 102 may be, for example, a personal computer or mainframe computer manufactured by the International Business Machines Corporation of Armonk, N.Y., and may use an operating system sold under trademarks such as MVS, OS/2, or Windows NT.

Alternatively, the computer 102 may be an IBM RS/6000 530 workstation with 128 MB of main memory running AIX 3.2.5. The computer 102 may incorporate a database system, such as DB2 or ORACLE, or it may access data on files stored on a data storage medium such as disk, e.g., a 2 GB SCSI 3.5" drive or tape. Additionally, FIG. 1 shows that the computer 102 preferably includes an output module 124 for outputting/displaying information and images on a graphic display 126, print mechanism 128 or data storage medium 130. Other computers, computer architectures or database systems than those discussed above may be employed. For example, the encoder 104, periodicity finder 150 and formatter 152 may be incorporated in a facsimile machine or in the computer 102, or the invention may be embodied in special purpose hardware like an integrated circuit.

The encoder, periodicity finder and formatter may be housed in a first unit 108 and communicate with the computer 102 through a first interface 112. The interface may act as an input mechanism for establishing transmission parameters and certain variables, which may be implemented in suitable computer code. The interface 112 includes appropriate apparatus for formatting the data stream into whatever signal format is employed in the input and output channels 116A and 118A.

Similarly, the decoder 106 and deformatter 154 communicate with the computer 102 through a second interface 114. The interface communicates with and receives information from the computer 102 via input line 116B and output line 118B. The encoder 104, periodicity finder 150 and formatter, as well as the decoder 106 and deformatter 154 although shown as housed within a first unit 108 and a second unit 110, respectively, may both be included in the first unit 108, the computer 102, a facsimile machine, a print machine 134, a display 136, a scanner 132 or in any compatible device for which the encoder and/or decoder is performing a desired function. The interface 114 used in connection with the decoder 106 may be the same interface as interface 112, or if separate, of the same character and quality. In an alternate embodiment, the scanner 132, the print machine 134 or the display 136 may be externally communicatively coupled to the decoder unit 106 or the interface 114.

In the high level block diagram of FIG. 1, the encoder 104 and periodicity finder 150 receive data symbols s(k)—the symbols equating to a binary representation of a periodic bitonal halftoned image—and together encode them into a compressed data stream c(i) and pass them to the interface 112 for transmission to the decoder 106 via input and output channels 116B and 118B. The decoder 106 may receive the data stream and decode it to obtain reconstructed replicas of the original symbols s(k). The symbols may be chosen from the integers [0, 1, . . . , S−1], or a binary representation thereof. The assumption is that the symbol values are positive integers for clarity purposes. However, those skilled in the art will realize that the symbols may take on other than integer values. The symbols s(k) are supplied to the encoder 104 and employed therein to generate encoded data stream c(i).

Despite the specific foregoing description, ordinarily skilled artisans having the benefit of this disclosure will recognize that the encoder 104 and the decoder 106 discussed above may be implemented in a machine of different construction, without departing from the scope of the invention. As one example of many, one of the components such as print mechanism 128 and graphic 126 may be eliminated from computer 102; furthermore, the storage 122 may be provided on-board the processor 120, even though depicted separately in FIG. 1. Also, the processor 120 may be included in the first unit 108, the second unit 110 or in a machine using the fast dominant period finding method of the present invention.

Figure 5:
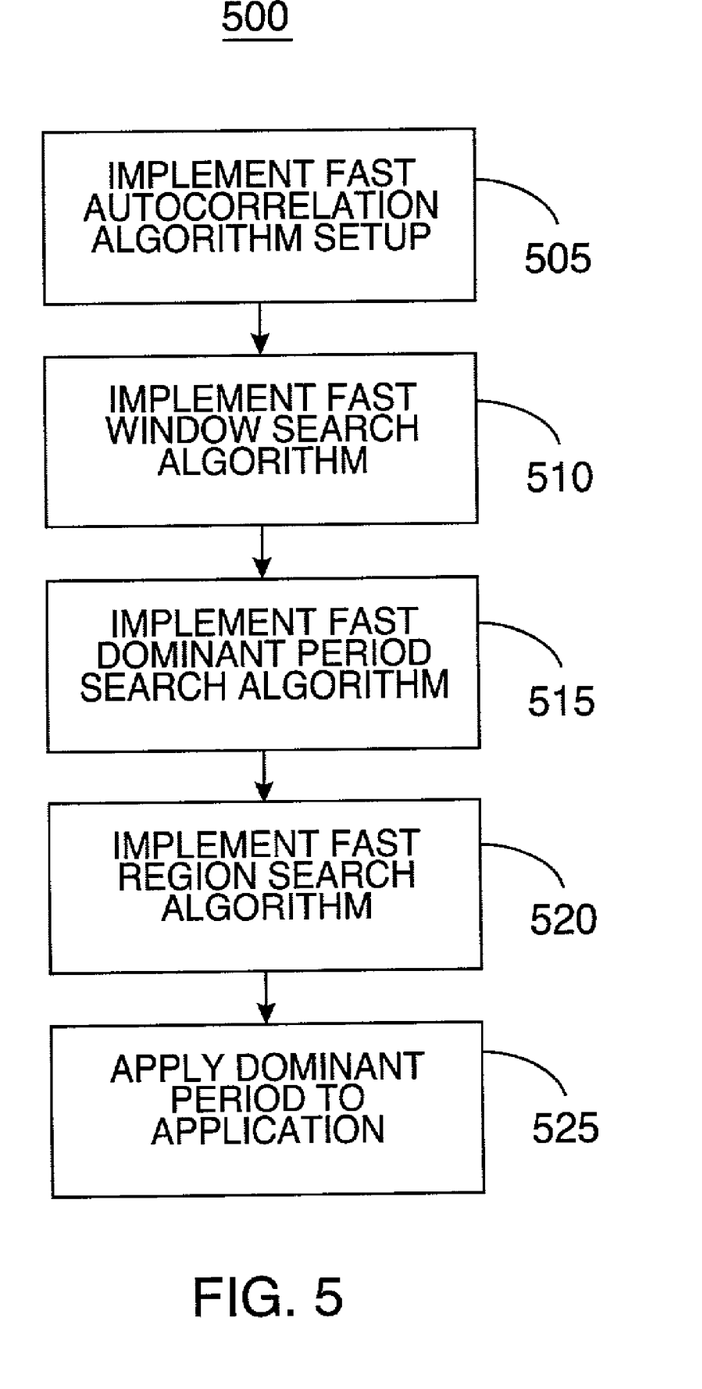
FIG. 5 is a high level process flow chart of an operational sequence in the apparatus of FIG. 1, for determining a dominant periodicity of a sequential binary signal in accordance with one embodiment of the present invention.

In addition to the various hardware embodiments described above, a different aspect of the invention concerns a method for automatically and expeditiously determining the optimal or dominant periodicity in bitonal images. FIG. 5 illustrates a representative process 500 for determining the dominant periodicity in the periodicity finder 150 apparatus of FIG. 1.

Process 500 starts at step 505 by implementing a fast autocorrelation computing algorithm, used to find the dominant periodicity of a signal. Optionally, and at step 510, process 500 estimates the dominant periodicity within part(s) of a single line.

At step 515, process 500 implements a fast search algorithm that uses the fast autocorrelation algorithm to determine (1) if the dominant periodicity of the signal exists, and if so, (2) to identify such dominant periodicity. At step 520, and if needed, process 500 estimates the dominant periodicity within a large sequence.

At step 525, process 500 applies the dominant periodicity to a periodicity exploiting application.

Process 500 will now be described in more detail in connection with FIGS. 2 through 4 and FIGS. 6 through 7.

1. Fast Autocorrelation Algorithm Setup

The first process describes a fast autocorrelation algorithm whose objective is to quickly find the autocorrelation values of each lag interval for an transition-based representation to be used to find the dominant periodicity of a signal. As used herein, the transition-based representation covers the same or mixed, run-length and/or run-end edge representation.

Figure 2:
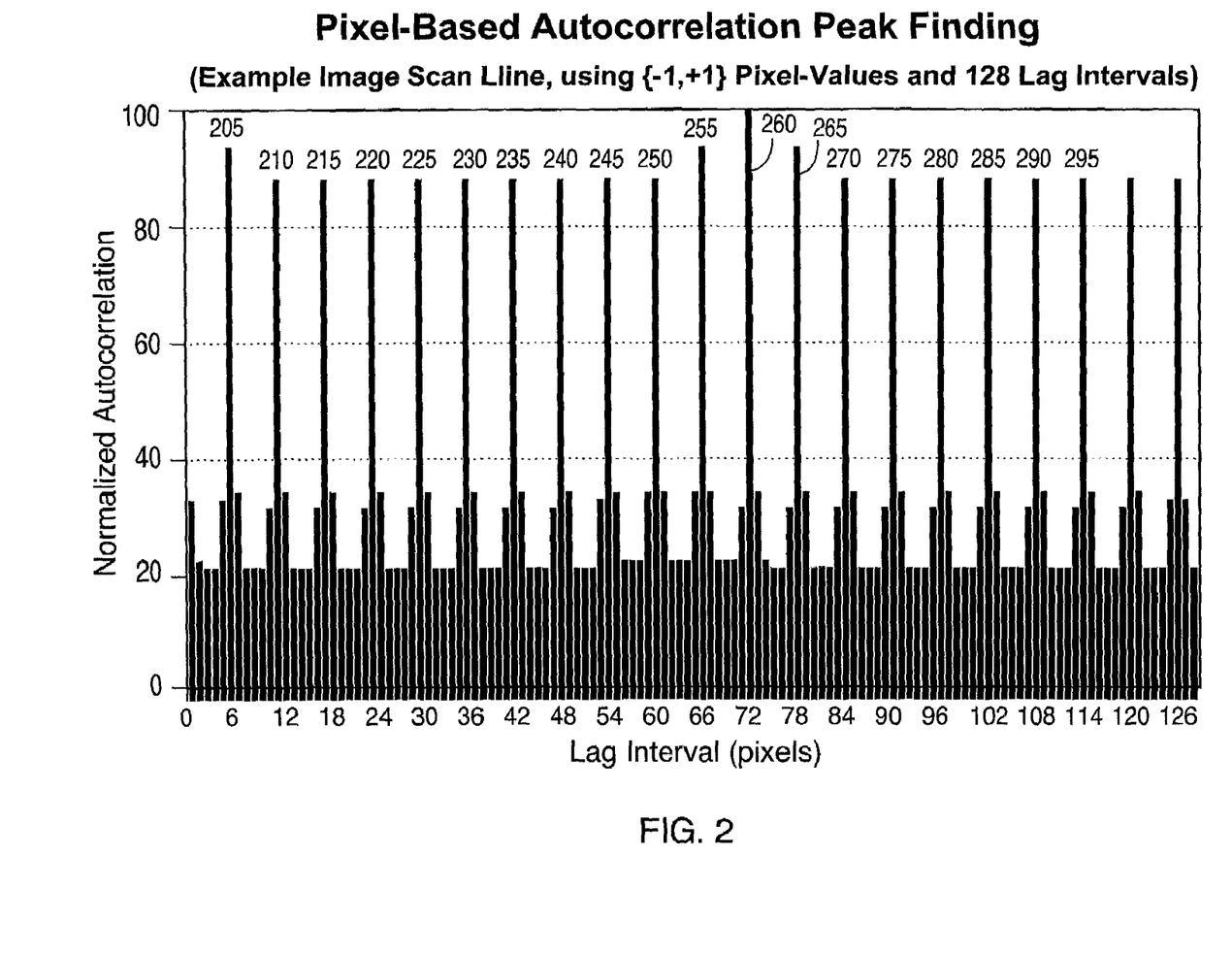
FIG. 2 is a plot illustrating the distribution of autocorrelation values that can be exploited by using an implementation of a fast dominant periodicity finding algorithm of the apparatus of FIG. 1, operating in a pixel domain.
Figure 3:
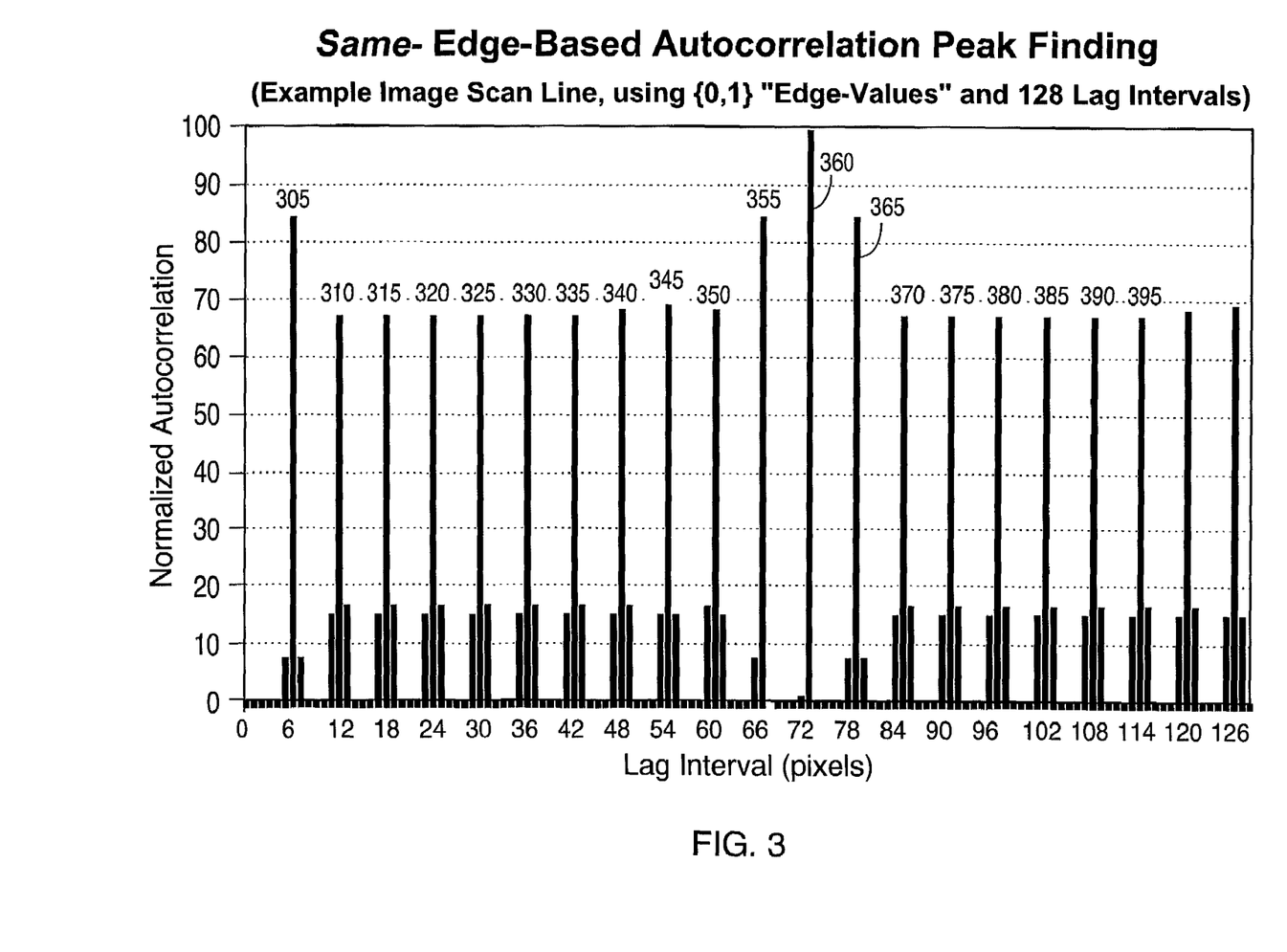
FIG. 3 is a plot illustrating the distribution of autocorrelation values that can be exploited by using an implementation of a fast dominant periodicity finding algorithm of the apparatus of FIG. 1, operating in a same edge run-end domain.
Figure 4:
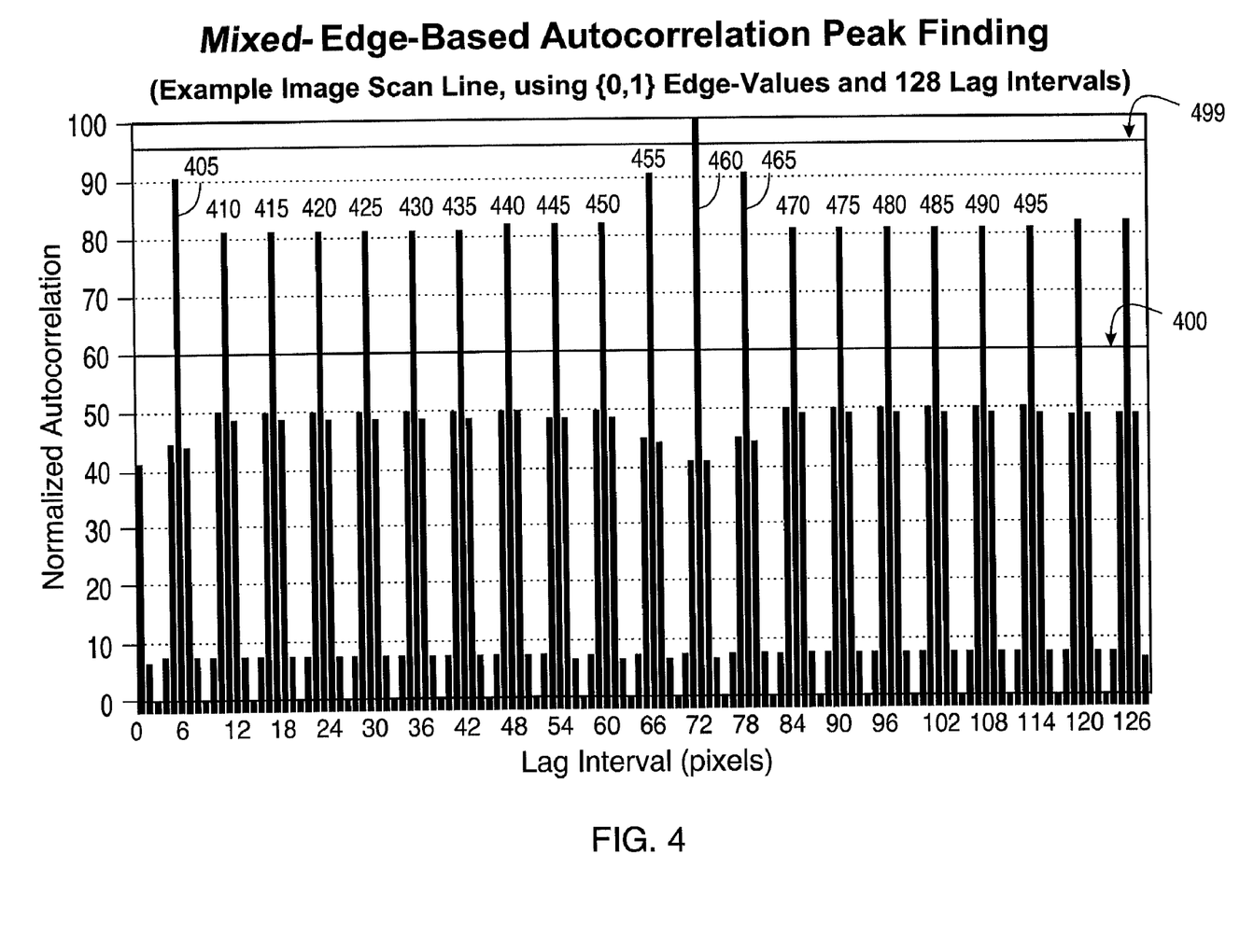
FIG. 4 is a plot illustrating the distribution of autocorrelation values that can be exploited by using an implementation of the fast dominant periodicity finding algorithm of the apparatus of FIG. 1, operating in a mixed edge run-end domain.

FIGS. 2, 3, and 4 describes various domains in which the present fast dominant periodicity finding algorithm can be implemented. FIG. 2 is a plot that illustrates the distribution of autocorrelation values that can be exploited by using an implementation of the fast dominant periodicity finding algorithm in a pixel domain. FIG. 3 is a plot that illustrates the distribution of autocorrelation values that can be exploited by using an implementation of the fast dominant periodicity finding algorithm in a same edge run-end domain. FIG. 4 is a plot that illustrates the distribution of autocorrelation values that can be exploited by using an implementation of the fast dominant periodicity finding algorithm in a mixed edge run-end domain.

The run-length representation is a relative representation that defines the number of consecutive pixels of the same color. As an example, a black run of length "n" refers to a continuous sequence of "n" black pixels.

The run-end or run-begin representations are absolute representations that define the runs in terms of their absolute positions with respect to a predefined reference such as the left margin. For example in a left-to-right horizontal scan line, the run-end is the distance of the end pixel of the run from the left margin. The salient concept in these representations are the absolute locating of transition pixels that delineate an 'edge' between two runs, expressed as either the end of one run (e.g., run-end) or the corresponding beginning of the next adjacent run (e.g., run-begin As an illustration, the following is a sequence of pixels in the original signal 'original pixel domain', where the data digit "0" denotes a pixel of a first color, and the data digit "1" denotes a pixel of a second color, with the forward slash "/" denoting a run edge, (for which the immediately preceding pixel is also referred to herein as its corresponding run-end transition pixel and the immediately following pixel is also referred to herein as its corresponding run-begin transition pixel):

Original pixel domain: {11111/000/1111/ . . . }

Converting, for example, to a transition-based representation, the fast autocorrelation algorithm expresses the foregoing sequence in terms of "transition" pixels in the 'run-end transition pixel domain', as follows:

Run-end transition pixel domain: {00001/001/0001/ . . . }

Converting next, for example, to a first run-based representation, the fast autocorrelation algorithm expresses the foregoing sequence in terms of "mixed" edges, in the 'run-end mixed-edge position domain' as follows:

Run-end mixed-edge position domain: {5, 8, 13, . . . }

Converting further, for example, to a second run-based representation, the fast autocorrelation algorithm expresses the foregoing sequence in terms of "same" edges, here using only the alternate run-ends representing "run-of-1s-to-run-of-0s" transitions (which cuts the foregoing sequence in half), in the 'run-end same-1/0-edge position domain' as follows:

Run-end same-1/0-edge position domain: {5, 13, . . . }

The latter two domains allow the fast autocorrelation algorithm to in effect "skip" processing at most pixel positions by focusing only on all or half of the run-ends, thus improving the signal processing time.

To mathematically describe the remap of the original bitonal image into a horizontal scan line transition image based upon run-end coding of mixed edges, each pixel being represented as $x_i$, (i=0, . . . , N−1) in a bitonal image of n pixels, the value $x_i$ is equal to 1 if $x_i$ is a "transition" pixel (i.e., the last pixel in a run of pixels of the same color), and $x_i$ is equal to 0 otherwise.

The autocorrelation at a lag "l" of the random sequence $\{x_i\}$, is R(l) as defined by the following relationship:

$$R(l) = \sum_{n=l}^{N-1} x_{n-l} * x_n.$$

The normalized autocorrelation ρ(l) is defined by the following relationship:

$$\rho(l) = \frac{R(l)}{R(0)} = \frac{(1)}{R(0)} \sum_{n=l}^{N-1} x_{n-l} * x_n,$$

where $0 = \rho(l) = 1$.

In the foregoing equation, for binary sequences in the transition domain note that $X_{n-l}*X_n$ is equal to 0, except when both $x_n$ and $x_{n-l}$ are transition pixels ($x_{n-l}=x_n=1$). This observation is exploited to expedite the computation of such an edge domain autocorrelation by checking lag intervals only between transition pixels.

One embodiment to implement such an edge based autocorrelation is when the bitonal image is represented in what is referred to herein as mixed edge position domain form, where only transition pixel positions are stored and all of them are used. In this case, what is needed to calculate the mixed edge autocorrelation is to count how many run-ends of either color (i.e. "mixed") are at distance or lag "l" apart and divide by the total number of run-ends (i.e., R(0)). As a result, this normalized autocorrelation ρ(l) can be expressed by the following relationship:

$$\rho(l) = \frac{\text{Number of run-ends at distance } l}{\text{Number of run-ends}}.$$

FIG. 2 is a plot that illustrates results from implementation of the fast dominant periodicity finding algorithm using autocorrelation in the original pixel domain. This implementation assigns data values "−1" and "+1" to the two pixel colors. This implementation also computes the absolute value of the autocorrelation for its output, in order to exploit both "sameness" or "oppositeness" in finding the optimal dominant period for a pixel periodicity exploiting compression algorithm like JBIG.

FIGS. 3 and 4 illustrate two edge-based domains for which this fast autocorrelation method can be implemented. FIG. 3 is a plot that illustrates results from implementation of the fast dominant periodicity finding algorithm in a same edge run-end domain. FIG. 4 is a plot that illustrates results from implementation of the fast dominant periodicity finding algorithm in a mixed edge run-end domain. In order to implement a fast autocorrelation method, both of these plots are computed using bitonal image data expressed in terms of the runs (specifically the run-ends) in each horizontal scan line.

2. Fast Dominant Period Search Algorithm

The second process describes a fast search algorithm that uses only the fast autocorrelation values computed at certain lag intervals to determine (1) if a dominant peak in autocorrelation for the signal exists, and if so, (2) to rapidly identify such a dominant peak in autocorrelation.

Note that with this search algorithm, the previous fast autocorrelation algorithm does not have to calculate the autocorrelation for all of the given lag intervals. The fast search algorithm recognizes additional "shortcuts" to further speed-up the dominant autocorrelation peak finding process. This fast search algorithm relies on the experimental observation that the peaks 205, 210, 215, and so forth in FIG. 2; the peaks 305, 310, 315, and so forth in FIG. 3; and the peaks 405, 410, 415, and so forth in FIG. 4, occur at multiples of a "fundamental" lag interval for the leftmost peak (e.g. 205, 205 and 405). In turn, this lag interval for the leftmost peak is recognized to be an integer divisor of the lag interval for the dominant peak in autocorrelation being sought (this leftmost peak would be recognized as a 'harmonic' in a frequency based representation).

To this end, and with reference to FIG. 4, for example, a fast mixed edge autocorrelation algorithm is applied sequentially for increasing lag intervals, which in the present illustration vary from 1 to 128. A "peak" is only recognized if the fast search algorithm determines that the autocorrelation exceeds a predetermined threshold 400.

The leftmost autocorrelation peak 405 defines the fundamental lag interval (or fundamental period). The fast search algorithm proceeds with the search for the dominant peak period 460 on the basis that this peak period is a multiple of the fundamental period 405.

In the illustration of FIG. 4, the fundamental lag interval 405 corresponds to the fundamental lag interval 6. The fast search algorithm knowing the fundamental period 405, and that the dominant peak period 460 corresponds to a natural multiple of the fundamental lag interval 6, proceeds with the analysis of the original signal only at multiples of the fundamental lag interval 6, i.e., 12, 18, 24, etc. This peak-to-peak search is referred to herein as incremental peak finding.

When this peak-by-peak search is completed, the fast search algorithm determines the lag interval with dominant autocorrelation 460, which, in this example, corresponds to the lag interval 72 (a multiple of 6). In order to find this tallest peak, the fast search algorithm implements a pairwise comparison which recursively stores only the tallest peak seen up to that point. This process eliminates the need to store all the peak values (unless needed or desired) along with their lag interval values.

According to another embodiment, when a predetermined sufficient autocorrelation 499 is reached or exceeded, the fast search algorithm sets this peak as the sought dominant peak period.

This fast search algorithm will now be mathematically described. For almost periodic halftones the random sequence $\{X_i\}$, can be expressed by the following relationship:

$$x(i) = \sum_{k=1}^{m} y_k(i) = w(i), \text{ where } i = 0, N, \ldots, N-1$$

where y(k) is a periodic component, and w is a noise component. The autocorrelation for such an almost periodic halftone representation will exhibit the same periodicity with the sequence x(i) and will tend to be the sum of the periodic autocorrelation functions of each periodic component y(k). As the lag "l" increases, the autocorrelation of the noise component diminishes, and eventually vanishes.

The method for fast detection of the "best" (also referred to as dominant or optimal) period in the sequence x(i), i.e., the lag "l" that maximizes the autocorrelation, is as follows:

(a) Successively, compute the autocorrelation $\rho(l)$ using the fast autocorrelation algorithm described earlier, for lag intervals "l" increasing from 1 to p, until the autocorrelation of "p," namely, $\rho(p)$ is greater than, or equal to $\rho_{threshold}$, a preselected threshold between $0<\rho<1$. It is noted according to the present invention, that when "p" is an integer divisor of the dominant period all the other periodic components beyond its lag interval in the sequence are multiples of "p". It should be noted that if there does not exist a lag "l" for which the autocorrelation $\rho(l)$ is greater than, or equal to $\rho_{threshold}$, then we conclude that there is no periodic component that is sufficiently powerful in the signal. As a result, the peak periodicity cannot be quickly determined from the signal.

(b) Continue computing the autocorrelations only for multiples of p, $\rho(K*p)=\rho_k$, as long (K*p) is less than, or equal to L, where L is a chosen lag interval bound for period search.

(c) Choose the t=(K*p) for which $\rho(t)$ is maximum as the dominant period.

3. Fast Window Search Algorithm for Dominant Window within One Line

Whereas up to now we have presented methods to find the dominant period in an image of many lines, here the third process describes an algorithm that more rapidly estimates the dominant window for finding the dominant periodicity within a single line (or image row). This process further speeds up the computation of autocorrelation in a line (or even an image) in that it uses only parts of the image rows ("windows"), rather than using the entire row. For example, an image row of w pixels wide, may be easily divided into 8 windows of roughly equal size (in pixels, but various sizes in run-ends). It is novel to deduce that the autocorrelation computation can be restricted to be computed only in the densest window (the window with the most run-ends).

This algorithm is preferably implemented following the domain generation phase of the above fast autocorrelation algorithm, and before the execution of the above fast dominant period search algorithm. Such a run-dense window selection process is useful not only to speed-up the computation, but can also be used to easily select the halftone part of a mixed (text/halftone) row.

4. Fast Region Search Algorithm for Estimating the Dominant Period

The fourth process describes an algorithm that addresses dominant autocorrelation lag interval finding for a larger block comprised of multiple scan lines or rows. As an example, this process expeditiously determines the dominant periodicity within a sequence of adjacent lines, or alternatively, within a two-dimensional contiguous image region.

Instead of computing the peak period for the entire block (each pixel and row in the block), the present invention implements the following heuristic algorithm:

(a) Apply the fast search algorithm described above for a number of successive image rows and compute the best period $t_j$ for each row j=1, 2, ..., m.

(b) Presuming that "K" different peak autocorrelations at lag intervals, $t_k$, were found, where "k" varies between 1 and K in the "m" image rows, update an array of counters COUNT($t_k$) indicating how many rows have $t_k$ as the peak period, where the sum of COUNT($t_k$) for "k" varying between 1 and "K" is equal to m.

(c) Choose the peak period "T" for the entire (large) sequence as: T={$t_k$ for which COUNT($t_k$) is maximum}.

For a large sequence, such as an entire halftone page, the halftone period can usually be estimated by restricting the search to only a sub-block. However, there is the sub-optimal possibility of finding as the dominant peak a local high frequency harmonic that can appear, for example, when a "macro-cell" used in the periodic halftoning contains a regular dot pattern.

5. Applying the Dominant Period to an Application (e.g. Compression)

The fifth process is application of the above fast dominant period finding methods to a periodicity exploiting application. Example applications include using the dominant period from a periodic bitonal image (like a halftoned image), in combination with the (PRECIS) mixed-edge periodicity exploiting compression algorithm or the JBIG pixel periodicity exploiting algorithm. Both of these algorithms require that the dominant periodicity for the bitonal image to be compressed be determined and input to them as an external parameter.

When applied to the same sample image scan line, the dominant period found using the various data domains illustrated in FIGS. 2, 3, and 4, were identical (i.e. lag interval 72 at peaks 260, 360 and 460, respectively).

Figure 6:
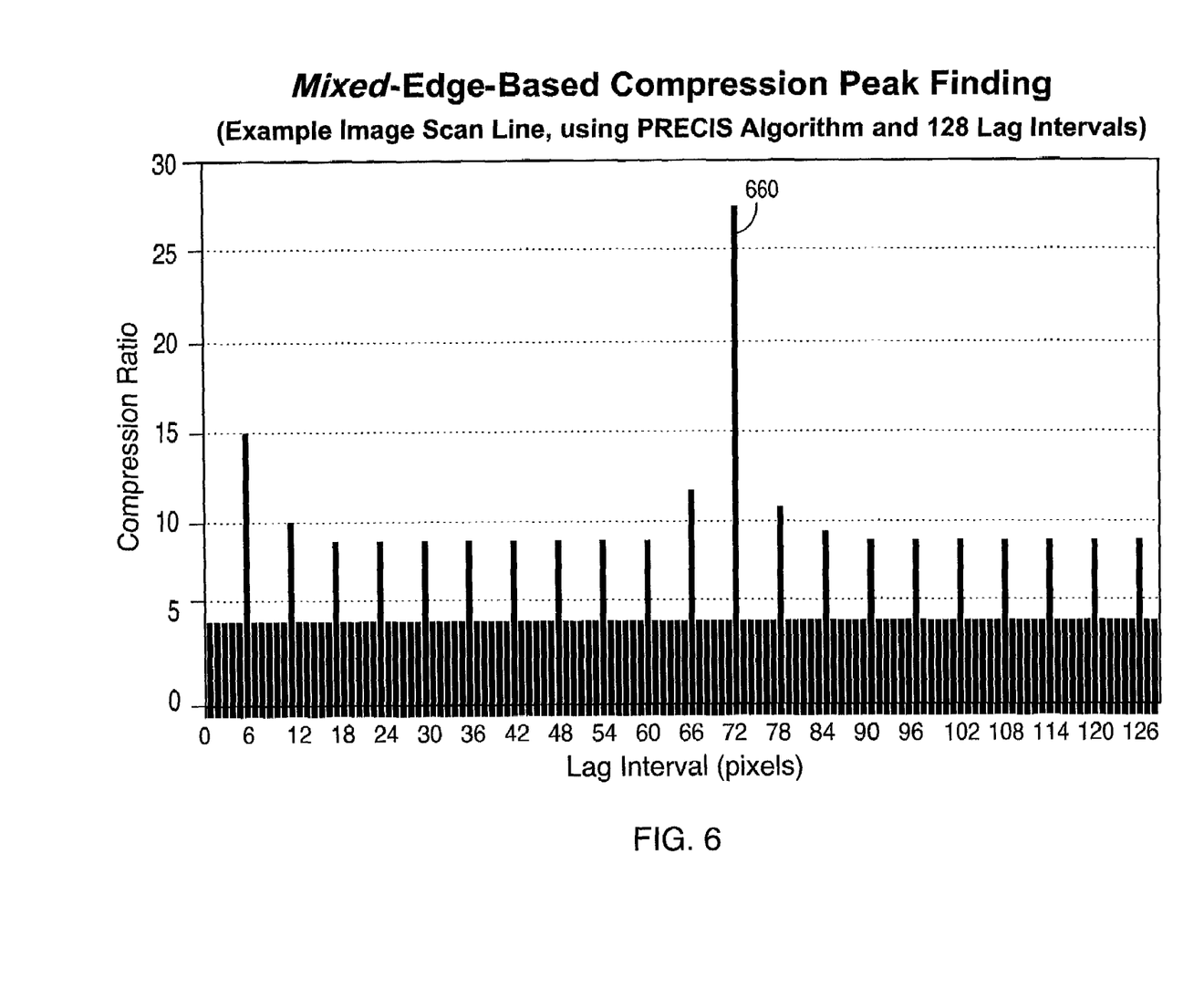
FIG. 6 is a plot illustrating the distribution of compression ratios that can be exploited by using an implementation of an edge periodicity exploiting compression (PRECIS) algorithm in the apparatus of FIG. 1.
Figure 7:
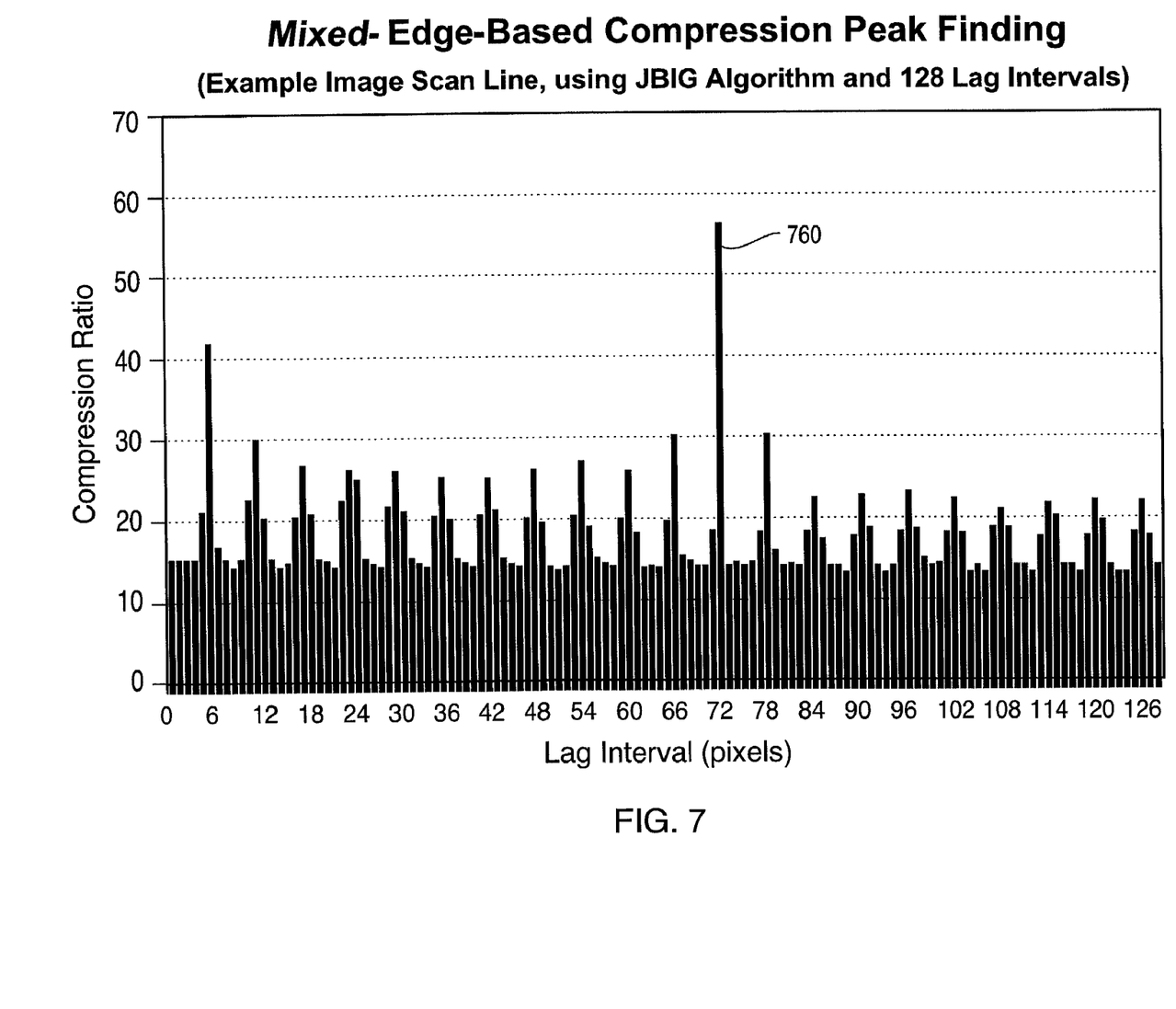
FIG. 7 is a plot illustrating the distribution of compression ratios that can be exploited by using an implementation of the JBIG pixel periodicity exploiting compression algorithm in the apparatus of FIG. 1.

FIGS. 6 and 7 are plots that illustrate the distribution of compression ratios that can be exploited by using an implementation of the (PRECIS) edge periodicity exploiting or JBIG pixel periodicity exploiting compression algorithm in the apparatus of FIG. 1. Testing on the same sample image scan line as was used for the plots of FIGS. 2, 3 and 4, note that the lag interval with maximal compression for both compression algorithms is again identical (i.e. lag interval 72 at peaks 660 and 760, respectively).

The above experimental results illustrate the novel insight that the dominant period for a bitonal image is pervasive, and can be robustly found using a variety of periodicity finding functions (and we can therefore satisfactorily choose to use the fastest one). The above empirical results also illustrates that such a dominant period can be robustly exploited by a variety of periodicity exploiting compression algorithms (and other periodicity exploiting algorithms).

It is to be understood that the specific embodiments of the present invention that are described herein are merely illustrative of certain applications of the principles of the present invention. Numerous modifications may be made without departing from the scope of the invention.

What is claimed is:

1. A method of automatically finding a dominant periodicity in a sequential binary file comprising:
   finding key peaks in autocorrelation value, corresponding to key lag intervals within the range of lag intervals in an autocorrelation distribution derived from the sequential binary file; and
   using only the key peaks in autocorrelation value, finding a maximal key peak in autocorrelation value, corresponding to a dominant periodicity at an optimal key lag interval from among the range of lag intervals.

2. The method of claim 1, wherein based on a first sequential binary file, finding key peaks in autocorrelation value includes using a second sequential binary file comprising a transition-based representation consisting of successive transition-data bits, each corresponding to successive original-data bits in the first sequential binary file.

3. The method of claim 2, wherein the transition-based representation comprises assigning numerical value 1 to any of transition-data bit immediately before the transition-data bit or immediately after a corresponding value change in the sequence of original-data bits, and assigning numerical value 0 to the remaining transition-data bits.

4. The method of claim 1, wherein the sequential binary file comprises a sequential two-dimensional image file of binary pixels.

5. The method of claim 4, wherein using the transition-based representation comprises using any one of a run-length relative position, a run-end absolute position, or a run-begin absolute position representation.

6. The method of claim 5, wherein using a run-based representation comprises using any one of a run-end or a run-begin absolute position representation.

7. The method of claim 6, wherein calculating the key peaks in autocorrelation value comprises using only the transition-data bits with the numerical value 1 in the transition-based representation.

8. The method of claim 7, wherein using any one of a run-end or run-begin absolute position representation further comprises getting absolute differences between any pair of successive run-end absolute position values.

9. The method of claim 8, further including developing an autocorrelation distribution of lag interval occurrences from the lag intervals.

10. The method of claim 7, wherein using any one of a run-end or run-begin absolute position representation further comprises getting absolute differences between any pair of successive run-begin absolute position values.

11. The method of claim 6, wherein using a run-based representation comprises using a run-length relative position representation.

12. The method of claim 11, wherein using a run-length relative position representation further comprises computing relative differences that represent all possible combinations of adjacent successive run-length relative position values.

13. The method of claim 12, further including representing the relative differences that represent all possible combinations of adjacent successive run-length relative position values as lag intervals.

14. The method of claim 4, wherein using the transition-based representation comprises transforming only the transition-data bits with the numerical value 1 to a run-based representation in a sequential integer file, comprising a sequence of any of absolute run-position values or relative run-position values corresponding to each successive transition-data bit with the numerical value 1.

15. The method of claim 14, further including representing the absolute differences between any pair of successive run-end absolute position values as lag intervals.

16. The method of claim 14, further including representing the absolute differences between any pair of successive run-begin absolute position values as lag intervals.

17. The method of claim 1, further including developing an autocorrelation distribution of lag interval occurrences from the lag intervals.

* * * * *